US007347380B2

(12) United States Patent
Ciesinger et al.

(10) Patent No.: US 7,347,380 B2
(45) Date of Patent: Mar. 25, 2008

(54) INSTALLING A FILE SYSTEM IN A DATA CARRIER

(75) Inventors: Daniel Ciesinger, München (DE); Gisela Meister, München (DE)

(73) Assignee: Giesecke & Devrient GmbH, Munich (DE)

(*) Notice: Subject to any disclaimer, the term of this patent is extended or adjusted under 35 U.S.C. 154(b) by 231 days.

(21) Appl. No.: 10/522,388

(22) PCT Filed: Jul. 24, 2003

(86) PCT No.: PCT/EP03/08121

§ 371 (c)(1),
(2), (4) Date: Aug. 26, 2005

(87) PCT Pub. No.: WO2004/013821

PCT Pub. Date: Feb. 12, 2004

(65) Prior Publication Data

US 2006/0157571 A1 Jul. 20, 2006

(30) Foreign Application Priority Data

Jul. 26, 2002 (DE) ................................ 102 34 158

(51) Int. Cl.
*G06K 19/06* (2006.01)

(52) U.S. Cl. ....................... 235/492; 717/100; 707/100

(58) Field of Classification Search ................ 235/451; 717/100

See application file for complete search history.

(56) References Cited

U.S. PATENT DOCUMENTS 4,874,935 A 10/1989 Younger
6,145,080 A 11/2000 Hänel (Continued)

FOREIGN PATENT DOCUMENTS

DE 197 39 545 C1 1/1999

(Continued)

OTHER PUBLICATIONS

Khare et al. ("XML: a door to automated Web applications", Internet Computing, IEEE, vol. 1, Issue 4, Jul.-Aug. 1997 pp. 78-87).*

(Continued)

*Primary Examiner*—Seung Ho Lee
(74) *Attorney, Agent, or Firm*—Martine Penilla & Gencarella, LLP

(57) ABSTRACT

A method for installing a file system (26) in a portable data carrier (10) comprises the steps of reading in specification data (SD) that at least partly describe the file system (26) at the semantic level, interpreting the read-in specification data (SD) by means of a processor core (12) of the data carrier (10), and installing the file system (26) in accordance with the interpreted specification data (SD) in a memory (14) of the data carrier (10). A computer-readable data carrier (30) and a device (28) for initializing and/or personalizing a portable data carrier (10) are equipped for storing specification data (SD) and/or transferring them into a portable data carrier (10) in accordance with the invention. The invention makes available a technique for installing a file system (26) in a data carrier (10) that reduces the hitherto strong dependency between the file format used and internal aspects of the operating system of the data carrier (10).

20 Claims, 2 Drawing Sheets

U.S. PATENT DOCUMENTS

| | | | | |
|---|---|---|---|---|
| 6,527,190 | B1 | 3/2003 | Weinländer | |
| 6,976,635 | B2 * | 12/2005 | Ashizawa et al. | 235/492 |
| 2001/0049675 | A1 | 12/2001 | Mandler et al. | |
| 2002/0035581 | A1 * | 3/2002 | Reynar et al. | 707/513 |

FOREIGN PATENT DOCUMENTS

| | | |
|---|---|---|
| EP | 0 292 248 A2 | 11/1988 |
| EP | 0 361 491 A2 | 4/1990 |
| EP | 0 361 491 B1 | 4/1990 |
| WO | WO 00/68902 | 11/2000 |

OTHER PUBLICATIONS

Handbuch der Chipkarten, 3rd Edition (1999), pp. 222-249.

W. Rankl et al., "Smart Card Handbook, Third Edition," 1999, pp. 250-281.

Website content entitled "XML in 10 points," 1999, pp. 1-4 (available at http://www.w3.org/XML/1999/XML-in-10-points.html).

* cited by examiner

```
<?xml version="1.0" encoding="UTF-8"?>
<!DOCTYPE filesystem SYSTEM "ISO7816.dtd">
<filesystem>
    <Group GroupID="perso" />
    <Group GroupID="users" />
    <Group GroupID="signers" />
    <Group GroupID="webusers" />
    <Personality UserID="Personalisation" PIN="123456"
                 Groups="perso"
                 Options="RemoveAfterLogout" />
    <Personality UserID="Notar" PIN="11111"
                 Groups="users,signers,webusers"
                 Options="LogoutAfterSign" />
    <Personality UserID="Public" PIN="123456" />
    <MF>
        <DF AID="#D276000005100C" FID="DF01" access="rw">
            <EF FID="C000" owner="Notar" group="signers"
                mode="rw-r--r--" LinkTo="DF01.ISF.RSA01"
                type="transparent" maxsize="2048" />
            <EF FID="C008" owner="Notar" group="webusers"
                mode="rw-r--r--" LinkTo="DF01.ISF.RSA02"
                type="transparent" maxsize="2048" />
            <ISF>
                <Key KID="01" Type="RSA" Usage="Signhash"
                    owner="Notar" group="signers"
                    mode="rw-------" />
                <Key KID="02" Type="RSA" Usage="SSL"
                    owner="Notar" group="webusers"
                    mode="rw-r-----" />
            </ISF>
        </DF>
    </MF>
    <EXE>
        <EXF EID="genrsa" owner="Personalisation"
            group="users" mode="rw---x---" />
        <EXF EID="signhash" owner="Personalisation"
            group="signers" mode="rw---x---" />
        <EXF EID="sslauth" owner="Personalisation"
            group="webusers" mode="rw---x---" />
    </EXE>
</filesystem>
```

INSTALLING A FILE SYSTEM IN A DATA CARRIER

BACKGROUND OF THE INVENTION

1. Field of the Invention

The invention generally relates to the technical field of installing a file system in a portable data carrier such as, for example, a smart card or a chip module.

2. Description of the Related Art

Before a data carrier can be ready for use, a file system has to be installed in it. This is typically done at the occasion of the initialization of the data carrier, i.e., at the occasion of the loading of data and/or programs that are identical for a largish number of data carriers. With this loading of data there are also determined either wholly or partly the structures and attributes (file tree, reading rights, etc.) of the file system. The file system may also be installed at the occasion of other manufacturing steps, for example at the occasion of the personalization, i.e. the loading of data that are individual for the data carrier and/or its subsequent user.

ISO 7816 is an industrial standard that describes how a file system in accordance with the standard can be installed in smart cards. In particular, ISO 7816 describes the CREATE FILE command, with which the individual files of the file system and the associated file attributes can be successively installed. The parameters of the CREATE FILE command are so designed that bit sequences from the data transmitted to the smart card are written into a memory of the smart card directly, i.e. without further transformation.

The precise format of the data transferred to the smart card for file system initialization is proprietary in most cases and may depend on the particular operating system of the card. This is particularly the case if the card comprises modifications or further developments as compared with the aforementioned standard, but also in other cases, because the standard admits a certain space for interpretation. Furthermore, ever increasing use is made of smart cards of which the file system cannot be initialized in accordance with ISO 7816 or with which this is at least not customary, a case in point being the Java Card™.

Given the strong machine orientation of the customary formats, special utility programs are needed for producing and processing the initialization data and these must likewise be matched to the particular smart card used in each case and its operating system. Such an utility program, specially designed for the STARCOS® smart card operating system of the applicant, is at present being marketed under the name STARMAG®. Here there also exists the problem that, on the one hand, the STARMAG® program cannot be used, or can be used only to a limited extent, for smart cards with other operating systems and that, on the other hand, possibly useful functions of other programs are not available for STARCOS® smart cards.

The hitherto mentioned problems do not exist only with a view to the format of the data that are to be transferred onto the smart card, but also with a view to the data format in which the necessary pieces of information about the file system that is to be installed are transmitted to an initialization and/or personalization device for smart cards. Here, once again, use is made of proprietary formats that also depend on the smart cards to be processed in each case and therefore call for special utility programs.

SUMMARY OF THE INVENTION

An object of the invention is to solve the aforementioned problems either wholly or in part. A further object of the invention is to make available a technique for installing a file system in a data carrier that reduces the hitherto strong dependency between the employed data format and internal aspects of the operating system of the data carrier. Yet a further object of preferred embodiments of the invention is that utility programs and tools that are commonly available in the market should be universally usable, i.e., usable in connection with file system installation data for widely differing data carriers.

According to the invention, the above objects are either wholly or in part solved by a method for installing a file system in a portable data carrier that is provided with a processor core and at least one memory, the method comprising the steps of reading in specification data that describe the file system at least in part at a semantic level, interpreting the read-in specification data by the processor core, and installing the file system in accordance with the interpreted specification data in the at least one memory of the data carrier.

Further according to the invention, the above objects are either wholly or in part solved by a portable data carrier comprising a processor core and at least one memory, the portable data carrier being adapted for reading in specification data that describe the file system at least in part at a semantic level, interpreting the read-in specification data by the processor core, and installing the file system in accordance with the interpreted specification data in the at least one memory.

Yet further according to the invention, the above objects are either wholly or in part solved by a device for initializing and/or personalizing a portable data carrier that comprises a processor core and at least one memory, the device being adapted for transferring to the portable data carrier specification data that at least partly describe at a semantic level a file system to be installed in the portable data carrier, the specification data being adapted for being interpreted by the processor core of the portable data carrier in order to install the file system in accordance with the interpreted specification data in the at least one memory of the portable data carrier.

Yet further according to the invention, the above objects are either wholly or in part solved by a computer-readable data carrier containing specification data that describe a file system at least in part at a semantic level, the specification data being designed to be read into a portable data carrier that comprises a processor core and at least one memory, the specification data further being designed to be interpreted by the processor core of the portable data carrier in order to install the file system in accordance with the interpreted specification data in the at least one memory of the portable data carrier.

The dependent claims define preferred configurations of the invention.

The invention starts out from the combination of two basic ideas. First of all, use is made of specification data that describe the file system to be installed in the data carrier at least partly at the semantic level. Secondly, these specification data are interpreted by a processor core of the data carrier. In this connection, an interpretation is generally to be understood as a certain processing and transformation of the data. An unmodified writing of received bit sequences into a memory of the data carrier is generally not an interpretation in this sense.

The invention achieves a considerable abstraction from the details of the operating system of the data carrier. Due to the fact that the interpretation of the specification data is undertaken by the data carrier itself, external systems do not need to know any internal aspects of the operating system, but can rather be used in combination with widely differing types of data carriers. There is thus no need to make the data structures available in the special format needed for storage. The technical uniformization obtained in this manner yields considerable savings as regards equipment, software and the training of employees. Furthermore, the encapsulation of internal data structures increases the security of the overall system against undesired configuration errors or intentional manipulation.

The enumeration sequence of the steps of the method claims is not to be understood as a limitation of the scope of protection. Rather, there are envisaged embodiments of the invention in which these method steps are carried out in a different sequence or either wholly or partially in parallel or either wholly or partially interleaved. In preferred embodiments, in particular, the specification data are read into the data carrier either piece by piece or in a continuous stream and in each case interpreted section by section, where the parts of the file system determined by the interpretation are always immediately written into the memory of the data carrier.

In preferred embodiments of the invention the specification data describe the files of the file system and the associated file attributes. The file attributes can define security settings, for example reading, writing and execution rights, and/or protocol settings, for example a transfer by means of Secure Messaging or Secure Sockets Layer (SSL). Furthermore, the specification data may state relations between files of the file system, for example the relation that two files constitute a pair of keys, the relation that a file constitutes a certificate for a key, or the file/owner relation. Due to these possible contents, the specification data in preferred embodiments represent a powerful means of description for the file system.

The specification data will preferably have a textual and/or portable and/or interoperable data format. Due to these measures, tools and auxiliary programs can be used for different data carriers in the same manner. Some preferred embodiments make use of widely used standard data formats, for example XML (extensible markup language), or formats corresponding to the encoding rules DER (distinguished encoding rules) or BER (basic encoding rules) or PER (packed encoding rules) that are provided for data structures that are defined in ASN.1 (abstract syntax notation No. 1).

For standardized data formats like the ones mentioned above there is available a multitude of universally utilizable tools. For example, specification data can be visualized in the XML format by means of customary web browsers. Numerous development engineers also already know formats of this type, so that no costly training is necessary. The specification data may be brought together in a single file or be made available in the form of several files.

The specification data are preferably presented to the initialization or personalization device already in the format in which they are then to be transferred to the data carrier. Such an embodiment has the advantage that the initialization or personalization device can be used for different data carriers without or with only a small effort for configuration. Particularly if external service providers undertake the initialization or personalization, the specification data are preferably protected by cryptographic means such as, for example, encryption and/or signature, against manipulation and/or spying. The decryption and/or testing of the signature can be undertaken by the data carrier itself, so that no attack possibilities exist outside the data carrier.

The portable data carrier, the initialization and/or personalization device and the computer-readable data carrier have, in preferred further embodiments, features that correspond to the features mentioned above and/or in the dependent claims. The computer-readable data carrier that contains the specification data in accordance with the invention does not necessarily need to be of a material nature. An electrical or electromagnetic signal, which is modulated in a way suitable for data transfer, can also be a computer-readable data carrier in this sense.

BRIEF DESCRIPTION OF THE DRAWINGS

Further features, objects and advantages of the invention are apparent from the description given hereinafter of several sample embodiments and embodiment variants. Reference is made to the schematic drawings, in which:

FIG. 2 shows an example representation of specification data that are given as an XML file.

DETAILED DESCRIPTION OF EXEMPLARY EMBODIMENTS

Figure 1:
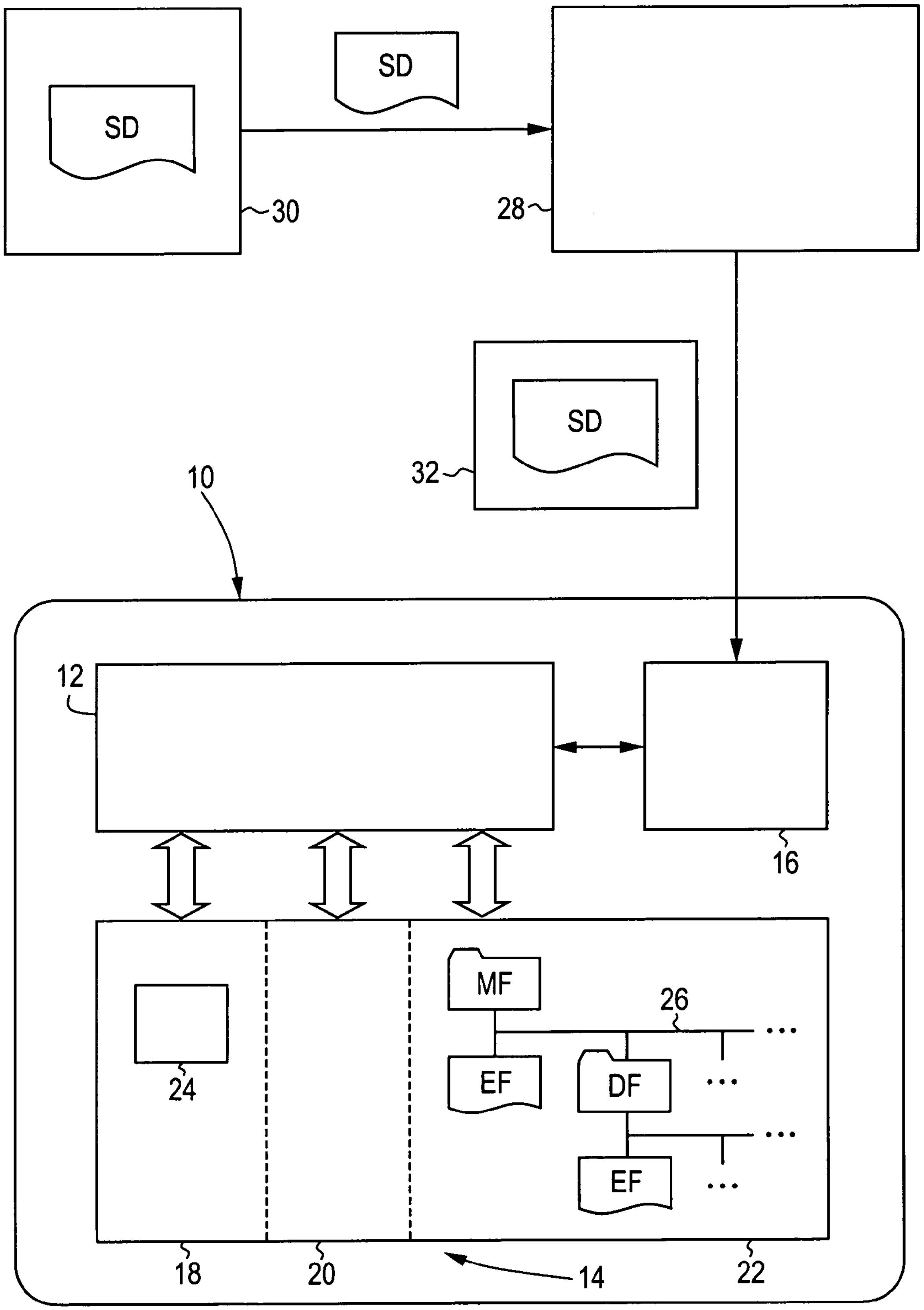
FIG. 1 shows a block diagram of components that play a part in a sample embodiment of a method in accordance with the invention.

FIG. 1 shows a portable data carrier 10 designed, for example, as a smart card or a chip module. In a manner that is known as such, the data carrier 10 is provided with a semiconductor chip in which there are formed a processor core 12, a memory 14 and an interface 16 for wire-based or wireless communication. The memory 14 is provided with several areas formed in different circuit techniques, i.e., in the present sample embodiment, a ROM area 18 with a mask-programmed fixed-value memory, a RAM area 20 with a volatile read/write memory and an area 22 with a non-volatile, re-writeable memory, for example, an EEPROM, a flash memory, etc.

The ROM area 18 of the memory 14 contains the operating system and the programs of the data carrier executed by this operating system. In particular, as part of the operating system there is provided an interpreter 24, the function of which will be discussed in greater detail further on. A file system 26 is to be installed in the EEPROM area 22. FIG. 1 shows, for the sake of illustration, a section of the file system 26 that corresponds to ISO 7816 and is provided with a root MF (master file) and several hierarchy levels of directories DF (dedicated file) and individual files EF (elementary file). In embodiment variants the file system 26 is established in accordance with other conventions or standards.

The data carrier 10 is connected to a device 28 that serves for the initialization and/or personalization of the data carrier 10. The device 28 can, for example, be provided in the form of an initialization or personalization system that is known as such or—in particularly simple embodiments—in the form of computer with an appropriate interface for coupling to the data carrier 10. The device 28 reads specification data SD from a computer-readable data carrier that can be designed, for example, as a diskette or a CD-ROM. In the present sample embodiment, the specification data SD are transferred as a command APDU (application protocol data unit) 32 to the data carrier 10.

The specification data SD contain a description in the semantic level of the file system 26 that is to be installed in the data carrier 26. In the present sample embodiment, this means that the specification data SD designate the structure of the file system 26 and the file attributes and the relationships between files in an abstract form that is independent of the structure of the bit sequences of the administrative data to be installed in the memory 14. The specification data SD may be available as a single file or be distributed over several files. For example, a first specification file can be used for establishing user information, a second specification file for producing the structure of the file system 26, a third specification file for combining the users in groups, and so on. In embodiments that make use of several specification files, it is preferred to send a corresponding number of command APDUs 32 to the data carrier 10.

FIG. 2 shows an example of specification data SD that are given in a portable and interoperative XML format. The file types MF, DF and EF of the file system 26 are here represented by corresponding XML tags <MF . . . >, <DF . . . > and <EF . . . >, and the nesting of these tags in the specification data SD defines the tree structure of the file system 26 to be produced. File attributes in the file system 26 are represented in the specification data SD by means of corresponding XML attributes. Thus, for example, the fundamental name attributes FID (file identifier) and AID (application identifier) are represented as XML attributes of the tags <DF . . . > and <EF . . . >. Further XML attributes designate the file type (type) and the maximum size (maxsize) of the file.

In the present sample embodiment, the specification data SD also define security settings of the individual files, in FIG. 2, for example, by means of the XML attributes access, owner, group and mode. Furthermore there are also defined links between the files, in FIG. 2, for example, by means of the XML attribute LinkTo. Further pieces of information regarding the file structure 26 to be created or other initialization or personalization values for the data carrier 10 may also be contained in the specification data SD. Some examples of such pieces of information are shown in FIG. 2.

For initializing or personalizing the data carrier 10 in the system of FIG. 1 there are at first produced the specification data SD. Whenever a textual data format is involved, an ordinary text editor may serve for this purpose. An appropriate tool, for example an XML generator, may be used for differently structured data formats. A customary web browser may serve for visualization.

The produced specification data SD are stored in the computer-readable data carrier 30 and from there be read into the initialization and/or personalization device 28. In the present sample embodiment, the device 28 does not carry out any processing of the contents of the specification data SD, but “packs” these data merely in a suitable command APDU 32 that is transferred to the portable data carrier 10.

The processor core 12 of the data carrier receives the command APDU 32 via the interface 16 and extracts the specification data SD contained therein. Controlled by the interpreter 24, the processor core 12 interprets the specification data SD and installs the file system 26 described therein piece by piece in the EEPROM area 22 of the memory 14. The individual files are produced during this process and the file attributes, inclusive of the security settings corresponding to the interpreted specification data SD, are set. Further, relations between files are defined and other settings are made in accordance with the specification data SD.

In the present sample embodiment, the interpretation by the processor core 12 simply ignores unknown elements of the specification data SD, for example unknown XML tags. It is therefore possible for the format of the specification data SD to be supplemented or extended, where even specification data SD in the extended format can still be interpreted by data carriers 10 that do not comprehend this extended format. Therefore the structural identity of the known elements of the specification data format is not lost.

The specification data SD may be present in the computer-readable data carrier 30 and/or during the transfer to the data carrier 10 in encrypted or signed form. The decryption and/or signature check will then take place in the portable data carrier 10. Since in the present sample embodiment the device 28 does not produce any modifications of the contents of the specification data SD, there is no need for a decryption to be undertaken here. No secured environment is therefore needed for the initialization and/or personalization process.

The particulars contained in the above description of sample embodiments should not be construed as limitations of the scope of the invention, but rather as exemplifications of preferred embodiments thereof. Accordingly, the scope of the invention should be determined not by the embodiments illustrated, but by the appended claims and their legal equivalents.

What is claimed is:

1. A method for installing a file system in a portable data carrier that is provided with a processor core and at least one memory, the method comprising the steps:

reading in of specification data that describe the file system at least in part at a semantic level, interpreting the read-in specification data by the processor core, and installing the file system in accordance with the interpreted specification data in the at least one memory of the data carrier.

2. The method in accordance with claim 1, wherein the specification data describe a file structure of the file system inclusive of file attributes.

3. The method in accordance with claim 2, wherein the file attributes designate at least one of the following:

security settings, protocol settings, and user/group associations.

4. The method in accordance with claim 1, wherein the specification data designate relations between files of the file system.

5. The method in accordance with claim 1, wherein the specification data are given in at least one of the following:

a textual format, a portable format, and an interoperative format.

6. The method in accordance with claim 1, wherein the specification data are given in XML.

7. The method in accordance with claim 1, wherein the specification data are cryptographically protected against at least one of manipulation and spying.

8. The method in accordance with claim 1, wherein the specification data are given in an encoding in accordance with the encoding rules for ASN.1—defined data structures.

9. A portable data carrier, comprising a processor core and at least one memory, the portable data carrier being adapted for reading in specification data that describe a file system at least in part at a semantic level, interpreting the read-in specification data by the processor core, and installing the file system in accordance with the interpreted specification data in the at least one memory.

10. The portable data carrier in accordance with claim 9, wherein the portable data carrier is at least one of a smart card and a chip module.

11. The portable data carrier in accordance with claim 9, wherein the specification data describe a file structure of the file system inclusive of file attributes.

12. The portable data carrier in accordance with claim 11, wherein the file attributes designate at least one of the following:

security settings, protocol settings, and user/group associations.

13. The portable data carrier in accordance with claim 9, wherein the specification data are given in XML.

14. A device for initializing and/or personalizing a portable data carrier that comprises a processor core and at least one memory, the device being adapted for transferring to the portable data carrier specification data that at least partly describe at a semantic level a file system to be installed in the portable data carrier, the specification data being adapted for being interpreted by the processor core of the portable data carrier in order to install the file system in accordance with the interpreted specification data in the at least one memory of the portable data carrier.

15. The device in accordance with claim 14, wherein the specification data describe a file structure of the file system inclusive of file attributes.

16. The device in accordance with claim 15, wherein the file attributes designate at least one of the following:

security settings, protocol settings, and user/group associations.

17. A computer-readable data carrier containing specification data that describe a file system at least in part at a semantic level, the specification data being designed to be read into a portable data carrier that comprises a processor core and at least one memory, the specification data further being designed to be interpreted by the processor core of the portable data carrier in order to install the file system in accordance with the interpreted specification data in the at least one memory of the portable data carrier.

18. The computer-readable data carrier in accordance with claim 17, wherein the specification data describe a file structure of the file system inclusive of file attributes.

19. The computer-readable data carrier in accordance with claim 18, wherein the file attributes designate at least one of the following:

security settings, protocol settings, and user/group associations.

20. The computer-readable data carrier in accordance with claim 17, wherein the specification data are given in XML.

* * * * *